United States Patent

[11] 3,619,788

[72] Inventors Olin S. Giles, Jr.; Seymour Paul, Jr., both of Lynchburg, Va.
[21] Appl. No. 815,998
[22] Filed Apr. 14, 1969
[45] Patented Nov. 9, 1971
[73] Assignee General Electric Company

[54] CIRCUIT FOR GIVING PRIORITY TO ONE OF A PLURALITY OF AUTOMATICALLY MONITORED CHANNELS IN A RECEIVER
7 Claims, 3 Drawing Figs.

[52] U.S. Cl. .......... 325/465, 325/464
[51] Int. Cl. .......... H04b 1/28
[50] Field of Search .......... 325/452, 456, 464, 465; 343/205, 206

[56] References Cited

UNITED STATES PATENTS 3,482,166 12/1969 Gleason .......... 325/341
3,497,813 2/1970 Gallagher .......... 325/456

*Primary Examiner*—Robert L. Griffin
*Assistant Examiner*—Kenneth W. Weinstein
*Attorneys*—James J. Williams, Frank L. Neuhauser and Oscar B. Waddell

ABSTRACT: A receiver is recurringly switched between channels until a signal is received and the receiver is locked onto that channel. If the receiver is locked on the nonpriority channel, a circuit is actuated to sample the priority channel repeatedly to determine whether a signal has since been received on the priority channel. If a signal is sensed on the priority channel during the sampling intervals, the receiver is switched from the nonpriority channel to the desired priority channel in spite of the presence of the signal on the nonpriority channel.

INVENTORS:
OLIN S. GILES,
SEYMOUR PAUL,
BY James J. Williams
THEIR ATTORNEY.

INVENTORS
OLIN S. GILES
SEYMOUR PAUL
BY
James J. Williams
ATTORNEY

CIRCUIT FOR GIVING PRIORITY TO ONE OF A PLURALITY OF AUTOMATICALLY MONITORED CHANNELS IN A RECEIVER

BACKGROUND OF THE INVENTION

This invention relates to a communication receiver, and particularly to a communication receiver which includes a circuit for automatically monitoring a plurality of channels and locking the receiver onto the channel which first receives a signal, while simultaneously providing a priority feature to make certain that a signal on the chosen channel is always given priority.

In police, public safety, or other two-way mobile communication systems, it is sometimes desirable and often necessary that the receivers, whether located in a vehicle or at a base station, monitor two or more channels on which communications may intermittently appear. For example, a local police communication system may provide for receivers in the police vehicles which are capable of receiving both the channel assigned for the local police system, as well as the channel assigned, for example, to the state police system. Since messages are transmitted over both of these channels only on an intermittent basis, it is desirable to provide some means by which both of the channels may be monitored, so that the information being transmitted over both channels may be available to each vehicle. To do so without requiring the operator to switch back and forth between the channels requires some means for performing this function automatically. Hitherto, this was achieved by simultaneous monitoring. In one such system, two or more different local oscillator signals are applied simultaneously to the receiver mixer. Such a simultaneous monitoring has not been ideal because of its negative effect on receiver performance due to its sensitivity to intermodulation, distortion, and other types of interference.

In another monitoring system, two selected, predetermined channels are monitored by an arrangement that sequentially switches the local oscillator frequency to receive the channels. This sequential switching continues until the appearance of a signal on one of the channels, at which time the sequential scanning is halted by an output from the receiver to lock the receiver on the channel receiving the first signal. This sequential monitoring system has been satisfactory in providing automatic access to a plurality of channels rapidly and accurately. But if this monitoring system is used in the above-mentioned example of the local police communication system which simultaneously monitors the local and state police frequencies, it is possible that a message may be received on the nonpriority channel first (i.e., the state police frequency), locking the receiver onto that channel. During the interval that a message is being received on the nonpriority state police channel, a message on the priority local police communication channel may not be received because the receiver is locked to the first received nonpriority channel. A need exists, therefore, for a more sophisticated system in which priority is at all times given to one channel so that receipt of a message on the priority channel will automatically transfer the receiver to the priority channel, even though a transmission may have been previously initiated and is continuing on a second nonpriority channel.

Therefore, one of the principal objectives of this invention is to provide an automatic monitoring system for a communication receiver in which a plurality of channels are automatically monitored in a repetitive and predetermined sequence, for assigning priority to one of the channels, and for locking the receiver on the channel first receiving a signal transmission.

A further objective is to provide an automatic multichannel monitoring system which locks a receiver to a channel first receiving a signal, but which automatically switches the receiver to a priority channel on receipt of a subsequent signal on the priority channel.

Other objectives and advantages of the invention will become apparent as the description thereof proceeds.

SUMMARY OF THE INVENTION

In accordance with the invention, the foregoing and other objectives are realized by providing a communication receiver in which a plurality of channels are scanned by sequentially injecting local oscillator signals of suitable frequencies to receive the different channels. This sequential scanning proceeds at a fixed rate until receipt of a signal on one of the channels. The appearance of a signal on one of the channels generates a disable signal from the receiver which interrupts operation of the scanning circuit and holds the local oscillator signal at the frequency required to lock the receiver on the one channel. If the receiver locks on the nonpriority channel, the priority channel is repeatedly sampled, even though a message is being received on the nonpriority channel. This sampling is for an extremely sort interval so as not to deteriorate the quality of the message being received. As soon as a signal is sensed on the priority channel, the receiver is locked on the desired priority channel, even though a signal is still being received on the nonpriority channel.

BRIEF DESCRIPTION OF THE DRAWING

The novel features, which are believed to be characteristic of this invention, are set forth with particularity in the appended claims. The invention, itself, both as to its organization and method of operation, together with further objects and advantages thereof, may best be understood by reference to the following description, taken in conjunction with the accompanying drawings, in which:

CIRCUIT DESCRIPTION

Figure 1:
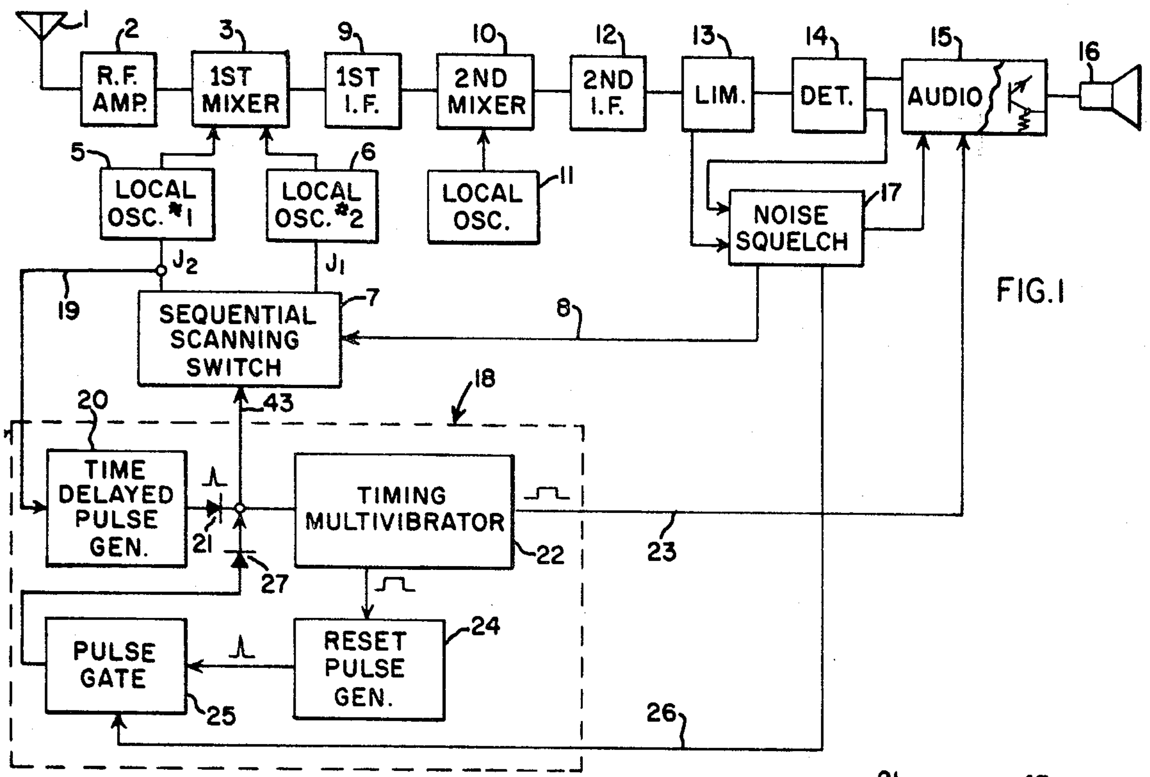
FIG. 1 is a block diagram of a communication receiver which includes a known sequential monitoring circuit and a channel priority circuit in accordance with the invention.

FIG. 1 illustrates, in block diagram form, a typical double-conversion, super heterodyne, communication receiver which includes a known multichannel sequential monitoring circuit. The monitoring circuit incorporates a local oscillator scanning switch for applying local oscillator signals of different frequencies to the receiver mixer to monitor selected channels, and a disabling circuit that halts the scanning switch to lock the receiver on the first received channel. In addition, a channel priority feature is provided in accordance with the invention to insure that communications over the priority channel are always given preference. The receiver includes an antenna 1 for receiving angularly modulated or amplitude-modulated signals on different channels (i.e., on different carrier frequencies). One or more radiofrequency amplifier stages 2 are coupled to antenna 1 for amplifying the received signals. The output from radiofrequency amplifier stages 2 is coupled to a first mixer or converter 3 along with signals from a source of local oscillations. The local oscillator signal source includes local oscillators 5 and 6 for supplying local signals of different frequencies F1 and F2 to the mixer 3, with the frequencies of the individual local oscillators being such that, when heterodyned with the received signals on any channel, the output of the mixer 3 is the desired intermediate frequency (IF) signal. This sequential monitoring of the various channels by selective injection of different local oscillator frequencies is achieved by means of a sequential scanning switch, shown generally at 7, which alternately energizes local oscillators 5 and 6 to apply the different local oscillator signals to the mixer 3 in a time sequence. Operation of the sequential scanning switch 7 is interrupted in a manner presently to be described, by a disabling signal received over a line 8 and generated in the receiver whenever a signal is received on one of these channels.

The output from the mixer 3 is coupled to one or more IF-amplifier stages 9. The amplified high-IF signal may be converted to an audio signal, or may be coupled to a second mixer 10, along with a signal from a local oscillator 11, to convert the high-IF signal to a second or low IF signal. The low-IF signal is amplified in one or more second or low-IF amplifier stages 12, and coupled, in the case of an angularly modulated signal, to a limiter 13, to remove any amplitude variations of the signal. The amplitude-limited signal is applied to a detector 14, such as a frequency discriminator in the case of angularly modulated signals, and the audio intelligence is extracted. The audio is then applied to one or more audio-amplifying stages 15, and then to a reproducing device such as a loud speaker 16.

The receiver also customarily includes a nose-squelch arrangement, shown generally at 17, for muting the audio stages during intervals when no signal is being received, thereby preventing the reproduction of objectionable electrical noise. Such noise-squelch or muting circuits are known, and typically include a noise-filter network coupled to the output of the frequency detector 14. The noise filter has a passband outside of the audio frequency band and produces a noise voltage whenever the noise level in the system rises due to the absence of a signal. The noise voltage is rectified and amplified to produce a DC control signal which biases the audio stages into cutoff. When a signal is received, the receiver noise level is reduced sufficiently so that the biasing voltage from the noise squelch circuit cannot mute the audio amplifier, thereby unsquelching the receiver and permitting reproduction of the audio intelligence. A unidirectional signal from the limiter 13, which is present whenever a carrier is being received, is also used as a positive disabling signal for the noise squelch circuit 17, although it will be obvious that the limiter-disabling feature may be dispensed with.

The disabling signal appearing on the line 8 is shown in the embodiment of FIG. 1 as being obtained from the noise squelch circuit 17; i.e., the change in the level of the rectified noise voltage is utilized as the disabling signal for the scanning switch 7. It will be appreciated, however, that the disabling signal may be taken from other stages of the receiver and not necessarily from the noise squelch circuit 17. For example, the disabling signal could be obtained from audio stages by rectifying the audio output, a signal present only if a signal is being received, or in fact, from the limiter 13. In fact, the signal may be taken from any part of the receiver wherein receipt of a signal produces a change in operating parameters.

Disabling of the switch 7 terminates switching of the local oscillator signal so that the local oscillator signal applied to the mixer 3 remains at the proper frequency to keep the receiver locked on the channel on which the signal is first received. It will also be understood by those skilled in the art, that although the arrangement of FIG. 1 illustrates two separate local oscillators 5 and 6, which are selectively energized by the scanning switch 7 to apply the different local oscillator signals in sequence, the system is not limited to this particular arrangement. It is obvious that a single oscillator capable of being switched electrically to the plurality of discrete frequencies may also be utilized. One example of such an arrangement could utilize a crystal-controlled local oscillator of the type having a plurality of crystals resonant at different frequencies. Each of the crystals is connected in series with a unidirectional conducting device such as a diode, and a unidirectional voltage from the switch 7 is connected to the diode so with the voltages of the proper polarity applied, the diodes are biased into conduction and connect the associated crystal to the oscillator. As the voltages are sequentially applied to the diodes, different crystals are connected to the oscillator. thereby switching the local oscillator signal frequency in order to monitor the channels.

The sequential scanning switch 7 may take any one of a number of known forms, such as a combination of bistable multivibrator (i.e., "flip-flop") along with a free-running pulse generator of the relaxation-oscillator type to produce a pulse train having a repetition rate equal to the switching rate. Thus, under monitoring conditions, the pulses from the pulse generator sequentially switch the conducting state of the bistable multivibrator, thereby sequentially applying a voltage of suitable polarity to the local oscillators to inject the local oscillator voltage of proper frequency. The disabling voltage on the line 8 is used to interrupt switching of the bistable multivibrator, either directly or by controlling a gate to block the pulses from the pulse generator.

A channel-priority-determining network, shown generally at 18, is provided in accordance with the invention. This network 18 is coupled to the scanning switch 7 and is actuated only when the receiver is locked on the nonpriority channel to sample the priority channel on a regular and recurring basis to determine whether a signal has been received on the priority channel on the interim. If a signal has been received in the interim, the receiver is switched back to the priority channel, even though the first-received nonpriority channel transmission has not terminated. To this end, the network 18 is coupled to the scanning switch output terminal J2 over a lead 19. The presence of an output voltage at the terminal J2, indicating that the receiver is switched to the nonpriority channel, conditions the network 18 to perform its function. The priority network 18 is, however, not effective during the time when the channels are being scanned but no signal is present on either channel. The network 18 includes a time-delayed pulse generator 20 which is coupled to the terminal J2. The pulse generator 20 produces an output pulse to actuate the rest of the circuit only in the event that a voltage of the proper polarity is present at the output terminal J2 for a sufficient length of time to indicate that a signal has been received on the nonpriority channel and the receiver is locked on the nonpriority channel.

The output from the pulse generator 20 is coupled through a suitably poled diode 21 both to the scanning switch 7 (to switch the receiver back to the priority channel) and to a timing multivibrator 22 which determines the duration of the priority-channel sampling interval. The timing multivibrator 22 produces a square wave pulse in response to a pulse from the generator 20 which controls the channel sampling time and also disables the audio stages of the receiver to prevent a noise burst in the receiver during the sampling period. The pulse from the multivibrator 22 is applied to the audio stages over a lead 23 and is of the proper polarity to disable or mute the audio stages, thereby preventing a rise in the noise level during sampling if no signal is present. This same pulse from the multivibrator 22 is applied to a reset pulse generator 24 that generates a reset pulse which returns the receiver to the nonpriority channel a fixed period of time later. The reset pulse from the pulse generator 24 is applied to a pulse gate 25 along with an enabling voltage derived from the receiver noise squelch circuit 17 on a lead 26. The pulse gate 25 is unblocked by the voltage on the lead 26, which may be the same signal as on the lead 8, or a separate signal as shown, indicating absence of a carrier signal. The gate 25 passes the reset pulse if the nose level in the receiver is such to indicate that no signal is present on the priority channel during the sampling interval. The pulse gate 25 is blocked if the noise level is such to that a signal is present on the priority channel. Thus, if no signal is sensed on the priority channel during the sampling period, the reset pulse from the generator 24 passes through the gate 25 and is applied through a suitably poled diode 27 to operate the sequential scanning switch 7 and return the receiver to the nonpriority channel. If, however, a signal is sensed on the priority channel during the sampling period, the reset pulse is blocked so that the receiver is locked on the priority channel until termination of the message on the priority channel.

Figure 2:
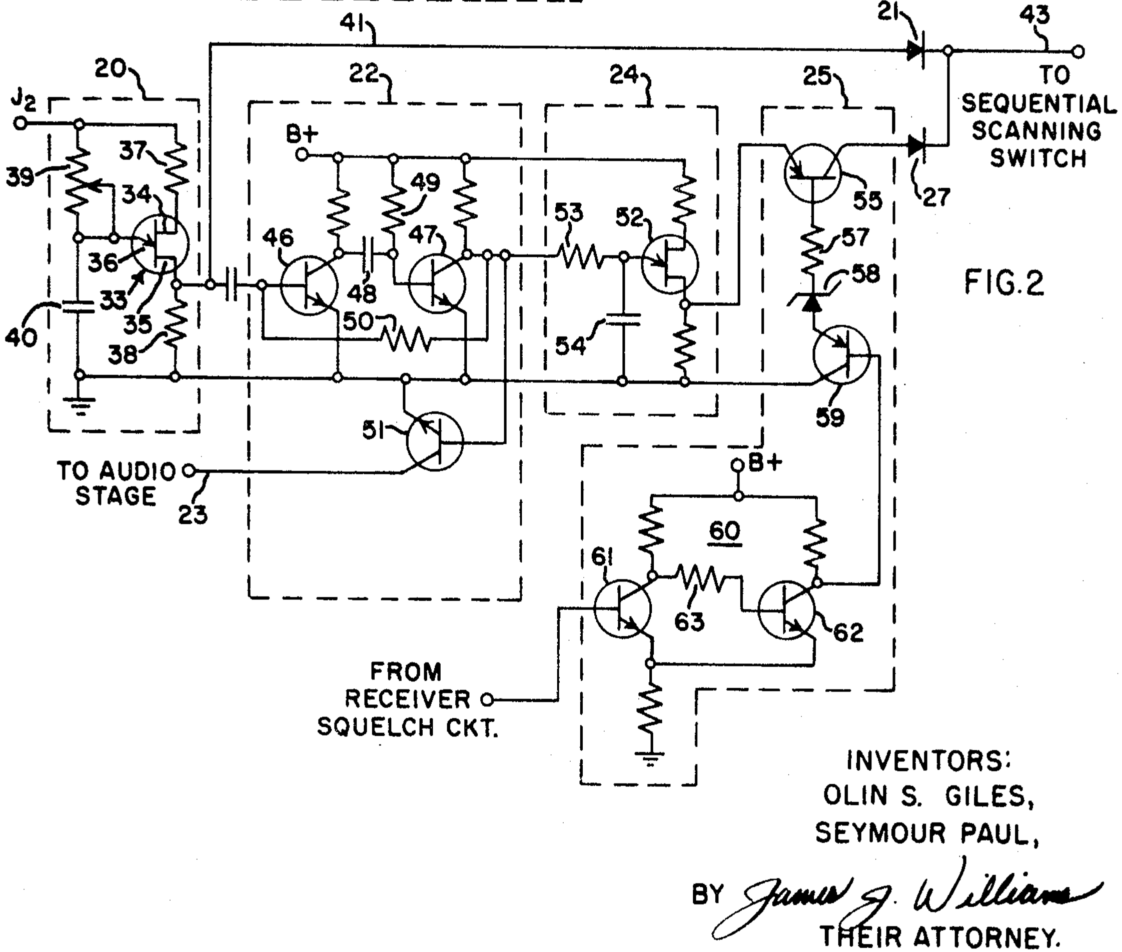
FIG. 2 shows a circuit diagram of one embodiment of a channel priority circuit in accordance with the invention.

FIG. 2 illustrates one embodiment of a circuit for performing the priority selection function described in connection with the network 18 shown in FIG. 1. For purposes of clarity, the same numerals are used for the same functional components illustrated in FIG. 1. The pulse generator 20 is a relaxation oscillator which is connected to the output terminal J2 of the sequential scanning switch 7 of FIG. 1. The voltage at the terminal J2 provides the supply voltage for a unijunction transistor 33 connected as an RC oscillator. The RC time constant of the oscillator is such that a pulse is generated only is the supply voltage at the terminal J2 (which in this instance is shown as positive) is present long enough to indicate that the receiver is locked on the nonpriority channel and is not merely in the search mode. The unijunction transistor 33 has a pair of base electrodes 34, 35 making ohmic contact with a slab of semiconductor material, and an emitter 36, which forms a rectifying junction with the semiconductor material. The base electrodes 34, 35 are connected respectively to the J2 terminal and a point of reference potential such as ground, through a pair of suitable resistors 37, 38. The emitter 36 is connected to the junction of a variable resistor 39 and a capacitor 40 which are connected in series between the J2 terminal and ground. The voltage at the emitter 36 is thus controlled by the RC time constant of the charging network resistor 39 and capacitor 40.

The RC time constant of the generator 20, relative to the sampling rate of the system in the search mode, is chosen so that in the search mode, the capacitor 40 144 charges to a level at which the voltage at the emitter 36 exceeds the intrinsic standoff ratio ($\mu V_{BB}$) of the transistor 33 before the positive voltage at the terminal J2 vanishes. The voltage at the emitter 36 thus never becomes sufficiently positive to forward-bias the junction so that no output pulse is produced. If the voltage at the terminal J2 remains positive for a sufficient period of time, indicating that the system is not in the search mode, but that a signal has been received on the nonpriority channel, the voltage on the capacitor 40 eventually becomes sufficiently positive to forward-bias the emitter 36. The unijunction transistor 33 conducts heavily, rapidly discharging the capacitor 40. This rapid discharge produces an instantaneous current flow through the base resistor 38, producing a short positive voltage pulse which is applied over a lead 41 and the diode 21 to an output terminal 43. The terminal 43 is connected to the sequential scanning switch 7 so that the positive pulse switches the receiver to the priority channel for a sampling interval to be determined by the remainder of the circuit. With the receiver locked on the nonpriority channel, the pulse generator 20 acts like a free-running relaxation oscillator and periodically produces an output pulse which switches the receiver to the priority channel to determine whether a signal has been received on the priority channel since the last sampling interval.

The trigger pulse from the generator 20 which switches the receiver to the priority channel is also applied to the timing multivibrator 22 to initiate a timing sequence for returning the receiver to the nonpriority channel if no signal is sensed on the priority channel. The multivibrator 22 is a monostable or "one-shot" type of multivibrator, which is triggered into the unstable stage by a positive pulse from the generator 20. The one-shot multivibrator returns to its stable state a fixed time after being triggered, thereby generating a fixed timing pulse which is used both to blank the audio stage 15 and to actuate the reset pulse generator 24. This multivibrator comprises a pair of NPN-transistors 46, 47, which are interconnected in such a manner that in the normal or stable state, the transistor 47 is conducting and the transistor 46 is nonconducting. The collector of the transistor 46 is connected through a suitable collector-resistor to the positive terminal B+ of a source of supply voltage, and its emitter is connected directly to the grounded or reference bus. The base of the transistor 46 is connected through a coupling capacitor to the output of the pulse generator 20. The collector of the transistor 46 is also connected through a coupling and timing capacitor 48 to the base of the transistor 47 to drive that transistor 47 into the nonconducting state on the appearance of the positive triggering pulse. The base of the transistor 47 is connected to the B+ supply terminal through a resistor 49. A feedback resistor 50 is connected from the collector of the transistor 47 to the base of the transistor 46.

In the normal or stable condition, the base of the transistor 47 is connected to the B+ supply, the the transistor 47 is conducting and in saturation. with the transistor 47 in saturation, the voltage at its collector is basically at the level of the grounded bus. Because of the feedback resistor 50, the base of the transistor 46 is also at ground potential, reverse-biasing the base-emitter junction of the transistor 46 and maintaining it in the nonconducting state. A positive pulse from the generator 20 drives the base of the transistor 46 positive, forward-biasing the base-emitter junction, and causing the transistor 46 to conduct. As a result, its collector voltage drops and a negative-going voltage is coupled through the capacitor 48 to the base of the transistor 47, reducing its collector current. The drop in collector current raises the potential at the collector of the transistor 47, and a positive-going voltage is fed back to the base of the transistor 46 through the feedback resistor 50, increasing the conductivity of the transistor 46. This process continues until the transistor 46 is driven into saturation and the transistor 47 is driven into cutoff, thereby reversing the normal state of the multivibrator.

When the stable conducting states of the transistors 46, 47 are reversed, the charge on the capacitor 48 drives the voltage at the base of transistor 47 to a potential below the potential at the grounded bus by an amount equal to the supply voltage. This comes about because, with the normal conducting states reversed, the collector of the transistor 46 is essentially at the potential of the grounded bus. The capacitor 48, on the other hand, is charged essentially to the supply voltage with the polarity shown. Since the capacitor 48 cannot discharge instantaneously, the base of the transistor 47 remains negative with respect to the grounded bus until the capacitor 48 has discharged sufficiently through the resistor 49 to raise the potential at the base of the transistor 47 to a level where the base-emitter junction is Forward-biased, at which time the conducting states reverse and the multivibrator 22 returns to its normal or monostable state. The multivibrator 22 then remains in the stable state until the appearance of the next triggering pulse from the pulse generator 20. It will be apparent, therefore, that each positive triggering pulse produces a positive-going pulse at the collector electrode of the transistor 47, the duration of which is controlled by the time constant of the capacitor 48 and the resistor 49. This pulse, as will be pointed out below, determines the duration of the sampling period for the priority channel since it is utilized to produce a reset pulse which returns the receiver to the nonpriority channel if no signal is sensed on the priority channel during the sampling interval.

To this end, the timing pulse from the collector of the transistor 47 is applied to the reset pulse generator 24 to produce a reset pulse for the receiver scanning switch 7. The timing pulse from the collector of the transistor 47 is also applied to a muting amplifier which applies muting voltage to the receiver audio stages 15 during the sampling interval in order to prevent a rise in the noise level in the receiver if there is no signal received on the priority channel during the sampling interval. Unless the receiver is muted during this sampling period, a high noise level will be reproduced at the receiver output, for, as is well known, the noise level, particularly in an angularly modulated receiver, rises substantially if no signal is being received. Therefore, the positive pulse from the transistor 47 is applied to the base of an NPN-amplifier-transistor 51, the emitter of which is connected to the grounded bus. The collector presents an impedance which varies inversely with the drive of the transistor 51. Under normal circumstances, the base and emitter of the transistor 51 are at ground potential, and the transistor 51 is cut off. The collector, therefore, presents a high impedance that does not mute the audio stages of the receiver. The positive timing pulse at the collector of the transistor 47 drives the base of the transistor 51 positive, so that the transistor 51 goes into saturation. The collector of the transistor 51 then presents a low impedance that does mute the receiver.

The timing pulse also actuates the reset pulse generator 24 which includes a unijunction relaxation oscillator. A unijunction transistor 52 has its base electrodes connected through dropping resistors to the B+ and grounded terminals of the supply voltage. The emitter of the unijunction transistor 52 is connected to the junction of an RC timing network comprising a resistor 53 and a capacitor 54. This RC timing network is connected in series between the collector of the transistor 47 and the grounded bus. It will be apparent that a positive pulse, produced at the collector of the transistor 47 when the multivibrator 22 has been triggered, causes the capacitor 54 to charge toward this positive voltage. The time constant of the RC network is such that capacitor 54 charges to a sufficiently positive voltage to forward-bias the unijunction transistor 52 and produces a reset pulse at the lower base electrode shortly before termination of the positive output pulse from the multivibrator 22.

The reset pulse from unijunction transistor 52 is applied to the pulse gate 25, which is controlled from the receiver squelch circuit 17. The gate 25 is either unblocked to return to the receiver to the nonpriority channel if no squelch signal is sensed during sampling; or blocked to keep the receiver on the priority channel if a squelch signal is sensed. The pulse gate 25 comprises a NPN-type transistor 55 having its emitter connected directly to the unijunction transistor 52, and its collector connected through the diode 27 to the scanning switch output terminal 43. The base of the transistor 55 is connected through a base resistor 57 and a zener diode 58 to the emitter of a control amplifier transistor 59. The emitter-collector path of the control transistor 59 is thus in series with the resistor 57, the zener diode 58, and the base of the transistor 55. The conductive state of the control transistor 59 determines whether the gate is blocked or unblocked, and whether the reset pulse is passed through the gate 25 to the scanning switch terminal 43. The base electrode of the transistor 59 is connected to the output of a switching amplifier 60, which is controlled from the receiver output to determine the condition of the gate 25.

The switching amplifier 60 comprises a pair of NPN-transistors 61, 62. The emitters of the transistors 61, 62 are connected through a common emitter-resistor to ground, and their collectors are connected to B+ through suitable collector-resistances. The base of the transistor 62 is connected through a coupling resistor 63 to the collector of the transistor 61, and the base of the transistor 61 is connected to the lead 26, which is connected either to the limiter 13 or to the noise-squelch circuit 17 of the receiver to produce a suitable input voltage which controls the switching amplifier 60. If no signal is sensed on the priority channel during sampling, the voltage on the lead 26 is negative, reverse-biasing the base-emitter junction of the transistor 61 and maintaining it in the nonconducting state. The voltage at the collector of the transistor 61 is, therefore, substantially at the voltage of the B+ terminal, applying a positive voltage to the base of the transistor 62, driving it into the conducting state. With the transistor 62 conducting (i.e., at saturation), its collector is essentially at ground potential. A lower voltage is, therefore, applied to the base of the transistor 59, driving it into conduction and completing the base path for the transistor 55. The gate 25 is, therefore, unblocked and passes the reset pulses from the pulse generator 24. In other words, with no signal on the priority channel, the pulse gate 25 is unblocked, permitting the reset pulse to pass through and return the receiver to the nonpriority channel. The receiver remains on the nonpriority channel, where a message is being received, until the next sampling period, at which time the sequence is again repeated.

If, on the other hand, a signal has been received on the priority channel since the last sampling interval, the voltage on the lead 26 is positive, driving the transistor 61 into the conducting state. The voltage at the collector of the transistor 61 drops essentially to ground potential, applying a lower voltage to the base of the transistor 62 driving it to cutoff. The voltage at the collector of the transistor 62 rises essentially to the voltage at the B+ terminal, applying a positive voltage to the base of the transistor 59. The base-emitter junction of transistor 59 is reverse-biased, driving it into the nonconducting state. The resistance of the emitter-collector path is now very high, and the base path of the transistor 55 is effectively open-circuited so as to block reset pulses from the generator 24. Thus, the appearance of a signal on the priority channel disables the pulse gate 25, and locks the receiver to the priority channel until the message is terminated.

CIRCUIT OPERATION

I. No signals received

With no signals on either channel the receiver is operating in the search mode. That is, the sequential scanning switch 7 operates at a predetermined rate to monitor both channels in a continuous sequence. For example, the scanning switch may operate eight times per second so that each of the channels is sampled four times each second, with the duration of each sampling interval being 125 milliseconds. Obviously, the sampling rate in the search mode may vary to suit the particular system needs, but a sampling rate of eight times per second has been found to work effectively and will, for the sake of convenience, be used in the description of the system operation. When the priority channel is to be sampled, the voltage of the terminal J1 of the switch 7 is positive and the voltage of the terminal J2 is at ground potential. With the voltage of the terminal J2 at ground potential, the pulse generator 20 remains in a disabled state, since both plates of the capacitor 40 in the RC timing network of the unijunction transistor 33 are at ground potential. When the nonpriority channel is sampled, the voltage at the terminals J2 goes positive, and the capacitor 40 begins to charge towards the positive voltage at a rate determined by the RC time constant of the resistor 39 and the capacitor 40. The RC time constant of the pulse generator is so chosen with respect to the intrinsic standoff of voltage ($\mu_{BB}$) of the unijunction transistor 33 and the volt-seconds of the positive voltage at the terminal J2, that the capacitor 40 cannot charge to a sufficiently positive level within 125 milliseconds to forward-bias the emitter 36. Thus the transistor 33 does not conduct and no pulse is produced. At the end of the 125 millisecond interval, the positive voltage at the terminal J2 is removed, and the capacitor 40 is discharged to ground. It is apparent, therefore, that the selecting network 18 does not become operative in the search mode.

II. A signal if first received on the priority channel

If, during the search mode of operation, a message is first received by the receiver on the priority channel, i.e., with the sequential scanning switch 7 energizing the local oscillator 2, the output from the noise squelch 17 or the limiter 13 disables the scanning switch 7 and maintains the local oscillator 2 operative. Thus, the receiver is locked on the priority channel. Correspondingly, the terminal J2 remains at ground potential, and the pulse generator 20 remains quiescent. Thus, if the receiver is locked on the priority channel, the selecting network 18 remains disabled. When communication on the priority channel ends, the switch 7 begins operating again so that both channels are monitored.

III. A signal is first received on the nonpriority channel

If, during the search mode of operation, a message is first received on the nonpriority channel, the output from the noise-squelch network 17 disables the sequential scanning switch 7 so that local oscillator 1 remains energized. The output potential at the terminal J2 becomes positive and remains positive as long as the signal is being received on the nonpriority channel. The capacitor 40 now begins to charge through the resistor 39 to the positive voltage at the terminal J2. After passage of some time (greater than the selected 125 milliseconds), the voltage at the junction of the resistor 39 and the capacitor 40 becomes sufficiently positive to forward-bias the emitter-electrode 36, so that a positive pulse is produced at base-electrode 35. This positive pulse is applied by the lead 41 and the diode 21 to the sequential scanning switch terminal 43 to operate the switch 7 so that the local oscillator 2 becomes operative. This switches the receiver to the priority channel to determine if a message is being received on the priority channel at this time.

The positive pulse from the generator 20 is also applied to the timing multivibrator 22 to initiate the timing sequence which will return the receiver to the nonpriority channel in the event no message is being received on the priority channel. The positive pulse is supplied to the base of the transistor 46 which forms part of the one-shot or monostable multivibrator 22. The positive pulse drives the transistor 46 into the conducting state and drives the normally conducting transistor 47 into the nonconducting state, causing the voltage at the collector of the transistor 47 to rise to the positive terminal. The multivibrator time constant is such that it returns to its normal stable state after a selected time after being triggered by the pulse from the generator 20. A preferred time is 10 milliseconds or less, depending upon other circuit parameters. It will be obvious, therefore, that the sampling interval is sufficiently short not to degrade the signal being received on the nonpriority channel. The 10-millisecond timing pulse is applied both to the base of the transistor 51 to squelch the audio stages of the receiver, and to the reset pulse generator 24. The capacitor 54 in the RC charging circuit of the unijunction transistor 52 begins to charge towards the positive voltage at the collector of transistor 47. The time constant of the resistor 53 and the capacitor 54 is such that the capacitor 54 charges to a voltage sufficiently positive to forward-bias the emitter electrode of the unijunction transistor 52 before the one-shot multivibrator 22 returns to its normal stable state. If 10 milliseconds is selected for the multivibrator 22, then a time constant of less than 10 milliseconds, for example 8 milliseconds, is selected. Thus, shortly before the termination of the timing pulse from the multivibrator 22, the reset pulse generator 24 produces a reset pulse which is applied to the pulse gate 25. The pulse gate 25 will transmit the reset pulse to the scanning switch terminal 43 if no signal is sensed on the priority channel during the sampling interval. If no signal is received during this time, the input voltage at the receiver squelch terminal 64 is negative. As previously explained, this causes the gating transistor 55 to be forward-biased, so that the reset pulse actuates the sequential scanning switch 7, to return the receiver to the nonpriority channel. When the receiver is returned to the nonpriority channel, a positive voltage is again applied to terminal J2 of the pulse generator 20. The capacitor 40 begins to charge, and another triggering pulse will be produced to sample the priority channel again. The pulse generator 20 continues to operate as a free-running generator during the time that the message on the nonpriority channel is being received, and switches the receiver to the priority channel for approximately 10 milliseconds following each period (approximately 125 milliseconds) of reception on the nonpriority channel. If no signal is received on the priority channel, then after communication on the nonpriority channel is ended, the switch 7 begins operating again so that both channels are monitored.

If, during a sampling interval, a message is received on the priority channel, a positive voltage appears at the collector of the transistor 62. As previously explained, this causes the gating transistor 55 to be blocked. Thus, the reset pulse cannot reach the terminal 43 or the switch 7. But once communication on the priority channel ends, the switch 7 begins operating again to return the receiver to reception on the nonpriority channel with interval sampling on the priority channel. Or if communication of the nonpriority channel ends, then both channels are monitored by the scanning switch 7.

The time constant of the reset pulse generator 24 is chosen to be slightly shorter than the time constant of the timing multivibrator 22, so that the scanning switch 7 is reset to return the receiver to the nonpriority channel before the audio-disable voltage is removed. This is to prevent the receiver speaker from reproducing the switching noise or other noise voltages that occur when the receiver is switched back to the nonpriority channel. Thus, it can be seen that the system achieves the desired result of providing search mode monitoring while, at the same time, affording priority for message signals on a selected channel, even though a message may first be received on the nonpriority channel.

PREFERRED CIRCUIT DESCRIPTION

Figure 3:
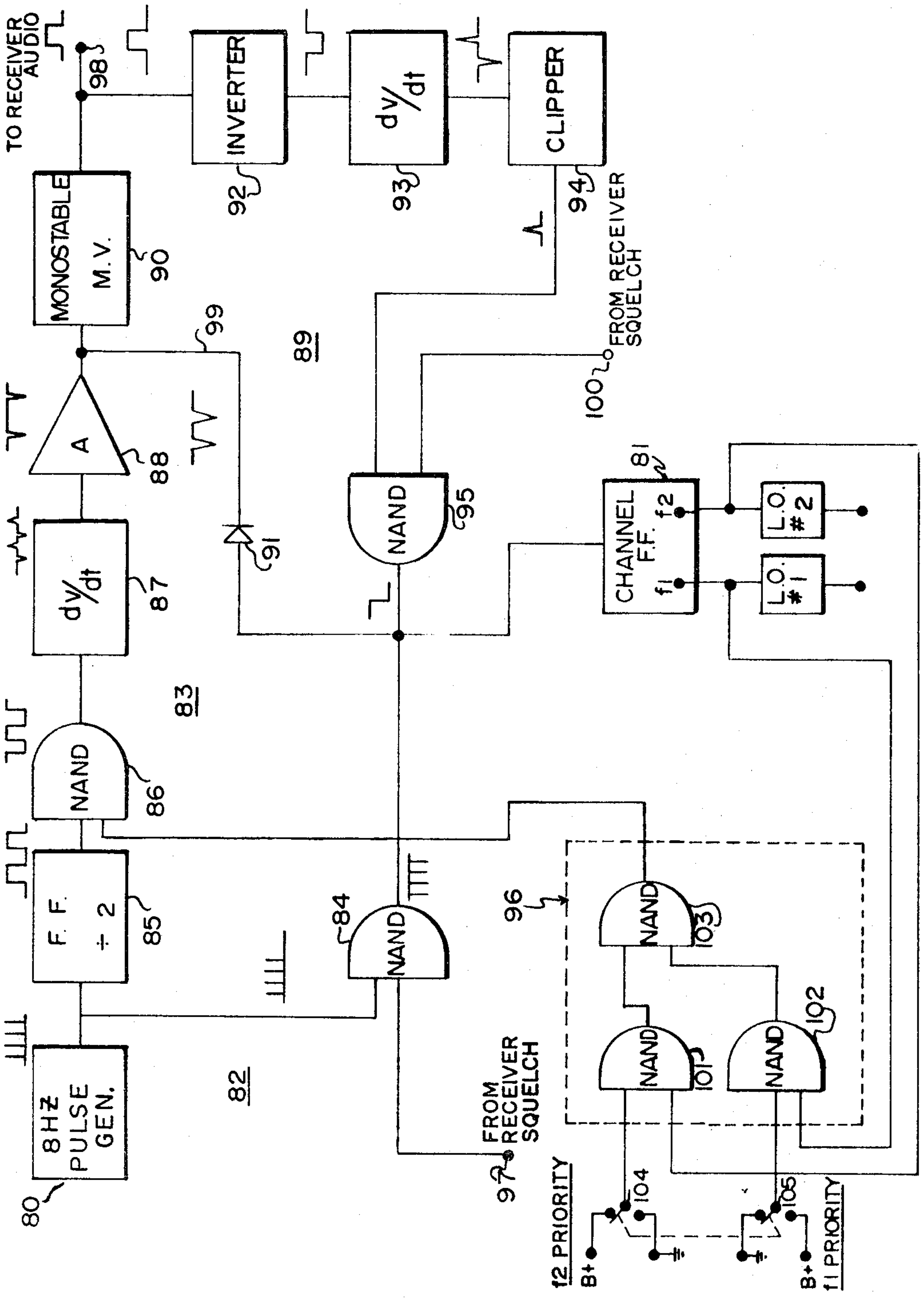
FIG. 3 shows a circuit diagram of a preferred embodiment of a channel priority circuit in accordance with the invention.

FIG. 3 illustrates an alternative and preferred embodiment of an arrangement The a channel priority circuit in accordance with the invention. In this embodiment, a free-running pulse generator supplies triggering pulses both for the search monitoring system and for the channel priority network. The circuit of FIG. 3 has a number of advantages, particularly in that standard available NAND logic gate and flip-flops packages may be utilized. This results in many benefits, particularly that available, integrated circuit packages may be utilized with the attendant economies of reduced space, power, and cost. The system of FIG. 3 includes a free-running pulse generator 80, which operates at the desired 8-Hertz sampling frequency. The generator 80 supplies triggering pulses to operate both a channel-switching flip-flop 81, which forms part of the sequential scanning switch, as well as the priority network. Thus, the output from the pulse generator 80 feeds a search mode path 82, and a priority channel-sampling control loop shown generally at 83. The search mode path 82 includes an inverted logic AND-gate 84 (hereafter referred to as a NAND gate), which transmits pulses to the channel switching flip-flop 81 only if the receiver is in the search mode, i.e., no signal is present on either channel. The pulses are also applied to the priority channel sampling loop 83, which includes a frequency-dividing flip-flop 85, a priority set NAND-gate 86, a differentiator 87, an amplifier-clipper 88, and a diode 91 connected in series between the amplifier-clipper 88 and the channel switching flip-flop 81. The sampling loop 83 is activated to switch the receiver periodically to the priority channel whenever the receiver is locked on the nonpriority channel. A priority channel reset control loop shown generally at 89 is connected with the priority channel-sampling loop 83. The reset loop 89, including a monostable multivibrator 90, an inverter 92, a differentiator 93, a clipper 94, and a reset NAND-gate 95, is connected in series between the output of the amplifier clipper 88 and the input of the channel flip-flop 81, to produce a reset pulse and switch the receiver to the nonpriority channel if no signal is detected on the priority channel during sampling. If a signal is detected during the sampling interval, the NAND-gate 95 is blocked, and prevents resetting of the receiver to the nonpriority channel. The condition of the NAND-gate 86 is controlled by a channel priority selector 96, which will be described in detail.

The NAND-gates 86, 84, 95 are well known in the art, and may be readily described by the following truth table:

| Logic Input No. 1 | Logic Input No. 2 | Logic Output |
|---|---|---|
| 0 | 0 | 1 |
| 0 | 1 | 1 |
| 1 | 0 | 1 |
| 1 | 1 | 0 |

In the following description, it is assumed that a logic 0 equals low voltage (0–1 volts, for example), and that a logic 1 equals high voltage (2–8 volts, for example). The output of a NAND gate is thus a logic 0 output (i.e., a relatively low voltage). In all other combinations of logic inputs, the output of a NAND gate is a logic 1 (i.e., a high voltage).

The frequency-dividing flip-flop 85 connected to the output of the pulse generator 80 divides the pulse rate (8 Hertz in the example given) to a square wave pulse having one-half the repetition frequency, i.e., 4 Hertz per second. In this fashion, sampling of the priority channel when the receiver is locked onto the nonpriority channel takes place at the same rate as sampling in the search mode, i.e., fur times per second. The 4 Hertz output pulses from the flip-flop 85 are applied to one input of the NAND-gate 86, the other input of which is connected to the priority selector 96.

In the search mode path 82, the NAND-gate 84 has one input connected to the pulse generator 80 and the other input connected to a receiver terminal 94. The terminal 97 corresponds to the lead 8 of FIG. 1. If the receiver is operating in the search mode, i.e., with no signals on either channel, the input at the terminal 97 is at a logic 1,so that both inputs to the gate 84 are at a logic 1 on receipt of each output pulse from the pulse generator 80. A logic 0 is, therefore, produced at the output of the NAND-gate 84 with each pulse from the generator 80. This logic 0 is applied to the channel switching flip-flop 81 to switch the local oscillator frequencies of the receiver. This sequence continues until a signal is received on one of the channels, at which time the receiver terminal 97 produces a logic 0 so that the NAND-gate 84 is blocked. With the NAND-gate 84 blocked, no further switching pulses are passed to the channel flip-flop 81, locking it on the channel on which the first signal was received.

The priority selector 96 consists of three NAND-gates 101, 102, 103. The outputs of the gates 101, 102 are connected to the inputs of the gate 103. The output of the gate 103 controls the NAND-gate 86 in the sampling loop 83. The priority selector 96 applies a logic 1 to the NAND-gate 86 if the receiver is locked on the nonpriority channel. This permits each pulse from the flip-flop 85 to produce a logic 0 at the output of the gate 86 and actuate the sampling loop 83 and switch the receiver to the priority channel. The selector 96 applies a logic 0 to the NAND-gate 86 if the receiver is locked on the priority channel, so that the gate 86 is blocked and the loop 83 is disabled. The priority selector 96 may be set to choose either of the channels as the priority channel. To this end, a pair of ganged, single-pole, double-throw switches 104, 105 are provided to apply a logic 1 to a logic 0 to the NAND-gates 101, 102. This logic, together with the logic at the output of the channel flip-flop 81, controls the output from the priority selector 96. Single-pole, double-throw switches 104 and 105 may be selectively moved between the contacts and connected to selectively apply either a logic 1 (positive voltage shown as B+) or a logic 0 (ground potential) to the gates 101, 102. The other inputs of the gates 101, 102 are connected respectively to the terminals F2 and F1 (which correspond to the terminals J2 and J1 of FIG. 1) of the channel-selecting flip-flop 81. These output terminals are the flip-flop output terminals which control the local oscillators 1 and 2, and thus lock the receiver onto channels 1 or 2 respectively.

If channel 2 is selected as the priority channel, the switches 104, 105 are thrown to the upper position as shown so that the switch 104 applies a logic 1 to one input of the gate 101, and the switch 105 applies a logic 0 to one input of the gate 102. If the receiver first locks onto the nonpriority or F1 channel so that local oscillator 1 is energized then the F1 terminal of the flip-flop 81 is at a logic 0 and the F2 terminal is at a logic 1. Under this condition, both inputs of the gate 101 are at a logic 1, and both inputs of the gate 102 are at a logic 0. Thus, the output of the gate 101 is a logic 0, and the output of the gate 102 is at a logic 1, With one input at a logic 0, the gate 103 produces a logic 1, thereby enabling the gate 86 in the sampling loop 83 to produce pulses. In other words, with the receiver locked on a nonpriority channel, the output from the priority selector 96 is such to enable the gate 86 in the sampling loop 83 to produce pulses and sample the priority channel to determine whether a priority signal has been received in the interim.

If, on the other hand, a signal is first received on the priority channel, the F2 terminal of the flip-flop 81 is at a logic 0, and the F1 terminal is at a logic 1. One input of each of the gates 101, 102 is, therefore, at a logic 0, so that the outputs of both gates 101, 102 are at a logic 1. The gate 103 produces a logic 0 to block the gate 86 in the priority-sampling loop 83. Thus, the priority selector 96 applies suitable logic to disable or block the priority sampling loop 83 whenever the receiver is locked on the priority channel.

The same sequence of events will also apply if the F1 channel is chosen as the priority channel and the switches 104, 105 are thrown to their lower position. In that event, the output from the priority selector 96 is such as to apply an enabling logic 1 to the gate 86 in the loop 83 whenever the receiver is on channel F2, and a blocking logic 0 to the gate 86 if the receiver is on channel F1. It will also be apparent from the foregoing description of the operation of the priority channel selector 96 that, during the search mode of the operation of the system, the loop 83 will be activated when the receiver is switched to the nonpriority channel for the 125-millisecond search interval. This, of course, will switch the receiver back to the priority channel, and it might be thought that this would interfere with the proper operation of the system in the search mode, However, when the relative timing is considered, it will be apparent that this is not the case. In the search mode, each channel is sampled for 125 milliseconds. During the search mode, when the receiver is switched to the nonpriority channel, then the sampling loop 83 will switch the receiver back to the priority channel. However, this lasts only for 8–10 milliseconds, or approximately 5 percent of the sampling duration, and the receiver immediately switches back to the nonpriority channel for the remaining portion of the 125-millisecond period. Thus, while the sampling of the nonpriority channel in the search mode is slightly reduced (8–10 milliseconds out of 125), it will be apparent that this reduction is not substantial. It will also be apparent that even this minor dislocation of the system might be avoided by inserting a time-delay circuit in each of the leads from the F1 and F2 terminals of the channel flip-flop 81 which are connected to the gates 101, 102.

The operation of the network illustrated in FIG. 3 may be understood from the following example. Assume that channel F2 is chosen as the priority channel as shown by the position of the switches 104, 105. The output from the gate 103 and the priority selector 96 is then determined by the channel to which the receiver is locked. Assume now for the moment that the first signal received is on the priority channel F2. A logic 0 is present at the receiver terminal 97 of the search loop 82. The gate 84 is blocked, and no further pulses from the generator 80 are applied to the channel-switching flip-flop 81. The flip-flop 81, therefore, remains in the state in which the local oscillator 2 is energized, locking the receiver on priority channel F2. The output from the priority selector 96, as described previously, is at a logic 0. This logic 0 is applied as one input to the gate 86 in the sampling loop 83. With a logic 0 input to the gate 86, this gate 86 is blocked, and the sampling loop 83 are inoperative, and the receiver remains locked to the priority channel until the termination of the message on that channel.

However, assume that the first signal received is on the nonpriority channel F1. In this case, the gate 84 is still blocked. But the sampling loop 83 is actuated to sample the priority channel repeatedly to determine whether a signal has been received on the priority channel in the interim. Specifically, both inputs to the gate 101 are at a logic 1. The gate 101 produces a logic 0 output which causes the gate 103 to produce a logic 1. Thus, the output from the priority selector 96 is at a logic 1 signal which enables the gate 86 in the sampling loop 83. The upper or logic 1 portions of the square wave from the frequency-dividing flip-flop 85, when applied to the gate 86, produce a lower or logic 0 portion at the output from the gate 86. Similarly, the logic 0 portions of the square wave produce a logic 1 output from the gate 86. Thus, the gate 86 inverts the square wave output pulse train from the frequency-dividing flip-flop 85. his inverted square wave is applied to the differentiator 87, which differentiates the leading and trailing edges of the square wave to produce a train of alternate positive and negative pulses. This pulse train is applied to the amplifier-clipper 88, which removes the positive pulses and produces a train of negative pulses having a repetition rate of 4 Hertz per second. These negative-going pulses are applied by the diode 91 to the channel flip-flop 81 to switch the receiver to the priority channel to determine if a message has been received on that channel in the interim.

The negative switching pulses for the receiver are also applied to the reset loop 89 to generate a reset pulse, and terminate the sampling interval a fixed period later if no signal is detected on the priority channel during the sampling interval. The negative pulses are applied to the monostable or one-shot multivibrator 90. The multivibrator 90 produces a positive timing pulse of fixed duration, which is utilized to mute the receiver during the sampling interval, and also to generate a reset pulse for the channel flip-flop 81. This pulse determines the priority sampling period, which is preferably in the order of 10 milliseconds. The positive pulse is applied over the receiver output terminal 98 to one of the audio stages of the receiver, to mute the receiver during this interval. The pulse is also applied to the inverter 92 which supplies a negative pulse to the differentiator 93. The differentiator 93 produces a negative and then a positive pulse, which are applied to the clipper 94 to remove the negative pulse. Thus, a positive pulse appears at the output of clipper 94, this positive pulse representing the trailing edge of the timing pulse from the monostable multivibrator 90. This positive pulse from clipper 94 is applied as one input to the reset gate 95, which also has an input from a receiver terminal 100. The terminal 100 may correspond to the lead 26 in FIG. 1. If no signal is sensed on the priority channel during this interval, the voltage at the input terminal 100 is at a logic 1. The positive pulse from the clipper 94, which is coincident with the trailing edge of the timing pulse from the monostable multivibrator 90, generates a logic 0 at the output of the gate 95. This logic 0 is applied to the channel flip-flop 81, and returns the receiver to the nonpriority channel at the end of the 10 millisecond sampling interval.

If, however, a signal is sensed at the priority channel during this sampling interval, the voltage at receiver terminal 100 becomes a logic 0 which blocks the gate 95 and also blocks the reset pulse. With the reset pulse blocked, the channel flip-flop 81 remains in the same state, thereby locking the receiver onto the priority channel and retaining it there until termination of the message on the priority channel.

It can be seen, therefore, that the system very effectively functions to lock the receiver onto the first channel received, while at the same time always giving priority to one preselected channel by continually sampling the priority channel, and automatically transferring the receiver to the priority channel if a signal is sensed on that channel. While only two embodiments of the invention have been shown, persons skilled in the art will appreciate that modifications may be made. For example, there may be more than one nonpriority channel utilized, and provisions made to sample the priority channel from any one of the nonpriority channels. Various switching and sampling periods may be provided, depending upon the preference in a given situation. Therefore, while the invention has been described with reference to particular embodiments, it is to be understood that modifications may be made without departing from the spirit of the invention, or from the scope of the claims.

What we claim as new and desire to secure by Letters Patent of the United States is:

1. In a radio receiver having means for causing said receiver to be receptive to a priority channel and to at least one nonpriority channel in a selected sequence, the improvement for making the receiver receptive to the channel having a signal, periodically monitoring the priority channel if the receiver remains receptive to a nonpriority channel, and making the receiver receptive to the priority channel if a signal is present thereon during a monitor period; said improvement comprising:

a. switching means having an input for switching pulses and an output adapted to be connected to the means for causing the radio receiver to be sequentially receptive to each channel in response to said switching pulses;

b. a pulse generator for producing switching pulses at a selected rate;

c. a first gate connected between said pulse generator and said switching means input, said first gate having an input adapted to be connected to said radio receiver so that said first gate passes switching pulses from said pulse generator to said switching means input in the absence of a received signal and blocks switching pulses from said pulse generator to said switching means input in the presence of a received signal on any channel;

d. a second gate connected between said pulse generator and said switching means input, said second gate having an input connected to a circuit so that said second gate passes switching pulses from said pulse generator to said switching means input only in response to said radio receiver being receptive to a nonpriority channel and blocks switching pulses from said pulse generator to said switching means input only in response to said radio receiver being receptive to a priority channel;

e. a timing circuit having an input for receiving switching pulses and an input for producing a delayed switching pulse at a selected time following receipt of a switching pulse applied to said timing circuit input;

f. and a third gate connected between said timing circuit output and said switching means input, said third gate having an input adapted to be connected to said radio receiver so that said third gate passes delayed switching pulses from said timing circuit to said switching means input in the absence of a received signal and blocks delayed switching pulses from said timing circuit to said switching means input in the presence of a received signal on any channel.

2. The improvement of claim 1 wherein said timing circuit input is connected to said second gate.

3. The improvement of claim 1 wherein said circuit connected to said second gate input is connected between said switching means output and said second gate input, and wherein said circuit comprises means for selecting which of said receiver channels is said priority channel.

4. The improvement of claim 1 and further comprising a frequency divider circuit connected between said pulse generator and said second gate for supply switching pulses to said second gate at a rate less than said selected rate.

5. The improvement of claim 10 and further comprising a frequency divider circuit connected between said pulse generator and said second gate for supplying switching pulses to said second gate at a rate less than said selected rate, and wherein said timing circuit input is connected to said second gate.

6. The improvement of claim 5 wherein said circuit connected to said second gate input is connected between said switching means output and said second gate input, and wherein said circuit comprises means for selecting which of said receiver channels is said priority channel.

7. The improvement of claim 5 wherein the selected time delay of said timing circuit is less than the time interval between said switching pulses produced at said selected rate by said switching means.

* * * * *

PO-1050
(5/69)

UNITED STATES PATENT OFFICE
CERTIFICATE OF CORRECTION

Patent No. 3,619,788 Dated November 9, 1971

Inventor(s) Olin S. Giles and Seymour Paul

It is certified that error appears in the above-identified patent and that said Letters Patent are hereby corrected as shown below:

Column 2, line 15: Change "sort" to -- short -- .

Column 4, line 14: Change "on" to -- in -- .

line 56: Change "nose" to -- noise -- .

line 58: After "to" insert -- indicate -- .

Column 5, line 2: Change "is", second occurrence, to -- if -- .

line 21: Change "144" to -- never -- .

Column 6, line 1: Change "with" to -- With -- .

Column 7, line 17: Cancel "to", second occurrence.

line 21: Change "NPN" to -- PNP -- .

Column 8, line 43: Change "if" to -- is -- .

Column 10, line 4: Change "The" to -- incorporating -- .

line 57: After "voltage)" and before the period, insert -- only if both inputs are logic 1 (i.e., a relatively high voltage) -- .

line 66: Cancel "fur" and insert -- four -- .

line 72: Cancel "94" and insert -- 97 -- .

Column 11, line 27: Cancel "to" and insert -- or --, (second occurrence).

Continued on Page Two - -

PO-1050
(5/69)

UNITED STATES PATENT OFFICE
CERTIFICATE OF CORRECTION

Patent No. 3,619,788 Dated November 9, 1971

Inventor(s) Olin S. Giles and Seymour Paul

It is certified that error appears in the above-identified patent and that said Letters Patent are hereby corrected as shown below:

Column 12, line 40: After "83" insert -- is disabled. Consequently, both the search loop 82 and the sampling loop 83 -- .

line 59: Cancel "his" and insert -- This -- .

Column 14, line 23: Cancel "input" and insert -- output -- .

Signed and sealed this 9th day of May 1972.

(SEAL)
Attest:

EDWARD M.FLETCHER,JR.
Attesting Officer

ROBERT GOTTSCHALK
Commissioner of Patents